US008745223B2

(12) United States Patent
Hodul

(10) Patent No.: US 8,745,223 B2
(45) Date of Patent: Jun. 3, 2014

(54) SYSTEM AND METHOD OF DISTRIBUTED LICENSE MANAGEMENT

(75) Inventor: Rastislav Hodul, Port Moody (CA)

(73) Assignee: Psion Inc., Mississauga, Ontario (CA)

( * ) Notice: Subject to any disclaimer, the term of this patent is extended or adjusted under 35 U.S.C. 154(b) by 557 days.

(21) Appl. No.: 11/251,603

(22) Filed: Oct. 14, 2005

(65) Prior Publication Data

US 2007/0088825 A1 Apr. 19, 2007

(51) Int. Cl.
*G06F 15/173* (2006.01)
*G06F 15/16* (2006.01)
*H04L 29/06* (2006.01)
*H04L 9/32* (2006.01)
*G06F 21/10* (2013.01)

(52) U.S. Cl.
CPC .............. *H04L 63/10* (2013.01); *H04L 63/101* (2013.01); *H04L 2209/603* (2013.01); *H04L 2463/101* (2013.01); *H04L 9/32* (2013.01); *G06F 21/10* (2013.01); *G06F 2221/2137* (2013.01); *G06F 21/105* (2013.01)
USPC ............. 709/225; 709/203; 709/229; 705/59; 726/27; 707/781

(58) Field of Classification Search
CPC . H04L 63/10; H04L 63/101; H04L 2209/603; H04L 2463/101; H04L 9/32; G06F 21/10; G06F 2221/2137; G06F 21/105
USPC ......... 709/203, 225, 229; 705/59, 51; 726/27; 707/781
See application file for complete search history.

(56) References Cited

U.S. PATENT DOCUMENTS

| 5,758,068 | A | 5/1998 | Brandt et al. | |
|---|---|---|---|---|
| 6,021,438 | A | 2/2000 | Duvvoori et al. | |
| 6,056,786 | A * | 5/2000 | Rivera et al. | 717/168 |
| 6,189,146 | B1 * | 2/2001 | Misra et al. | 717/177 |
| 6,502,124 | B1 * | 12/2002 | Shimakawa et al. | 709/203 |
| 6,601,175 | B1 * | 7/2003 | Arnold et al. | 726/7 |
| 6,925,497 | B1 * | 8/2005 | Vetrivelkumaran et al. | 709/225 |
| 7,171,662 | B1 * | 1/2007 | Misra et al. | 717/177 |
| 7,406,593 | B2 * | 7/2008 | Rabin et al. | 713/150 |
| 2001/0020241 | A1 * | 9/2001 | Kawamoto et al. | 707/202 |
| 2003/0028454 | A1 * | 2/2003 | Ooho et al. | 705/32 |
| 2004/0098620 | A1 * | 5/2004 | Shay | 713/201 |
| 2005/0050315 | A1 * | 3/2005 | Burkhardt et al. | 713/150 |

(Continued)

OTHER PUBLICATIONS

Canadian Office Action, CA application No. 2,523,394, dated Dec. 16, 2010.

(Continued)

*Primary Examiner* — Viet Vu
*Assistant Examiner* — Herman Belcher

(57) ABSTRACT

A distributed license management system and method for managing software licenses are provided. The disturbed license management system comprises a repository for storing workstation information, a message interceptor for intercepting a message call coming from a workstation to a server, a workstation identification module for determining if a workstation identifier associated with the message call is defined in the repository, and a device verification module for allowing access to the server if a device identifier of a workstation is associated with the workstation identifier. The method comprises the steps of storing workstation information, intercepting a message call coming from a workstation to a server, determining if a workstation identifier associated with the message call is defined in stored workstation information, and allowing access to the server if a device identifier of the workstation is associated with the workstation identifier.

13 Claims, 4 Drawing Sheets

(56) References Cited

U.S. PATENT DOCUMENTS

| | | | |
|---|---|---|---|
| 2005/0050319 A1* | 3/2005 | Suraski | 713/164 |
| 2005/0071280 A1* | 3/2005 | Irwin et al. | 705/59 |
| 2005/0153682 A1* | 7/2005 | Minear et al. | 455/405 |
| 2005/0187879 A1* | 8/2005 | Zigmond et al. | 705/59 |
| 2005/0273436 A1* | 12/2005 | Coley et al. | 705/59 |
| 2006/0064387 A1* | 3/2006 | Jose et al. | 705/59 |

OTHER PUBLICATIONS

Office Action for counterpart Canadian Patent Application No. 2523394 mailed on Feb. 16, 2009.

Office Action for counterpart Canadian Patent Application No. 2523394 mailed on Aug. 23, 2011.

* cited by examiner

SYSTEM AND METHOD OF DISTRIBUTED LICENSE MANAGEMENT

FIELD OF INVENTION

The present invention relates generally to distributed mobile applications, and in particular, to a system and method of software licensing in sometimes connected environments.

BACKGROUND OF THE INVENTION

Currently, mobile devices communicate through networks. Typically, the mobile device operates remotely on a radio frequency to a host server. In order for a web service to operating on a mobile device, the mobile device requires a connection to a server. Unfortunately, there are times when radio coverage and/or the server is not available. Such situations are referred to as "sometimes connected environments".

Multiple users may use mobile devices. For example, an enterprise may provide each worker with a mobile device to work with and report to a central server. Alternatively, a plurality of devices may be provided to a plurality of locations to be used by a plurality of users. When a mobile device is used, software that allows the mobile device to communicate with the host server is required.

In an always-connected environment, software licenses can be assigned to a number of devices. Unfortunately, licensing software on multiple mobile devices can be costly. Moreover, there can be unnecessary costs when a mobile device is not connected to a host server.

In one example of providing licensed software in a sometimes connected environment, a host server licenses is provided at cost, while mobile software is provided free of charge. However, in order for a mobile device to sync with the host server, a license is required. Thus, each mobile device requires a license, which is costly and not efficient. There is a need for a better way to provide licensed software to mobile devices in sometimes connected environments.

SUMMARY OF THE INVENTION

The present invention relates to distributed mobile applications where data collection takes place in environments with and without radio (or other telecommunication) coverage. It is an object of the invention to provide a system and method of distributed software licensing in sometimes connected environments.

In accordance with an embodiment of the invention, there is provided a distributed license management system for managing software licenses. The distributed license system comprises a repository for storing workstation information, a message interceptor for intercepting a message call coming from a workstation to a server, a workstation identification module for determining if a workstation identifier associated with the message call is defined in the repository, and a device verification module for allowing access to the server if a device identifier of a workstation is associated with the workstation identifier.

In accordance with an embodiment of the invention, there is provided a method of managing software licenses. The method comprises the steps of storing workstation information, intercepting a message call coming from a workstation to a server, determining if a workstation identifier associated with the message call is defined in stored workstation information, and allowing access to the server if a device identifier of the workstation is associated with the workstation identifier.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The following description is of a preferred embodiment.

The present invention will be further illustrated in the following examples.

Figure 1:
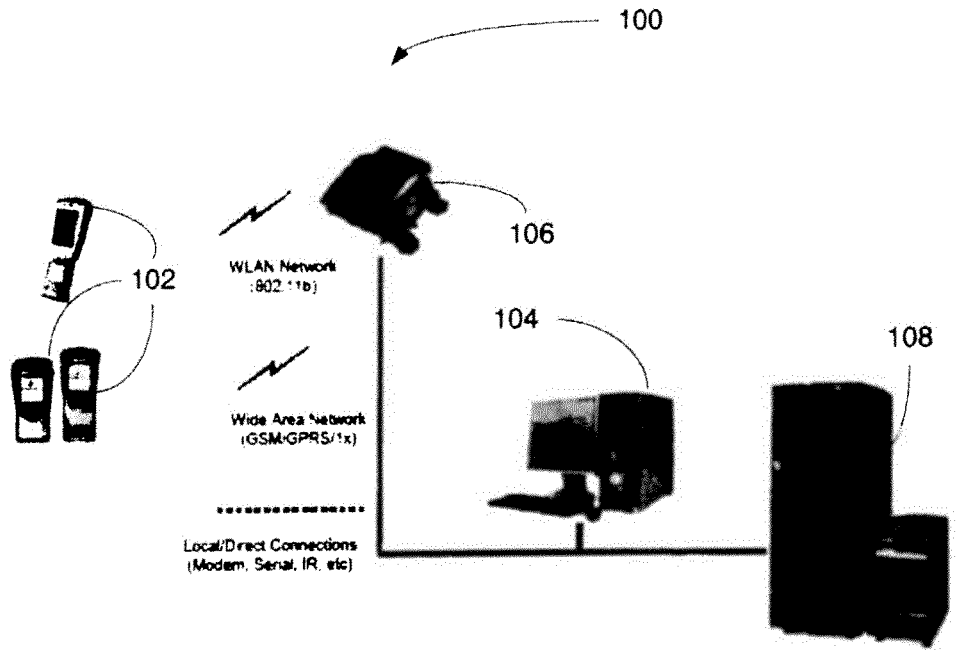
FIG. 1 shows in a network diagram an example of a system overview of a design, development and operational environment, in accordance with an embodiment of the invention.

FIG. 1 shows in a network diagram an example of a system overview 100 of a design, development and operational environment for deploying feature rich applications (that use web services) to mobile devices and desktop personal computers, in accordance with an embodiment of the invention. The system overview 100 comprises one or more or mobile client components (or handheld terminals) 102 for allowing a user to collect, review and modify data; a server component 104 for providing applications and connectivity options to external systems; a network 106 for allowing the handheld terminals 102 to communicate with the server component 104 via a communications protocol; and a back-end system (or host) 108 for providing a database or enterprise resource planning (ERP) system. Examples of mobile components may include personal computers (PCs), vehicle mount computers, tablet PCs, Windows CE terminals, personal digital assistants (PDAs), etc.

Figure 2:
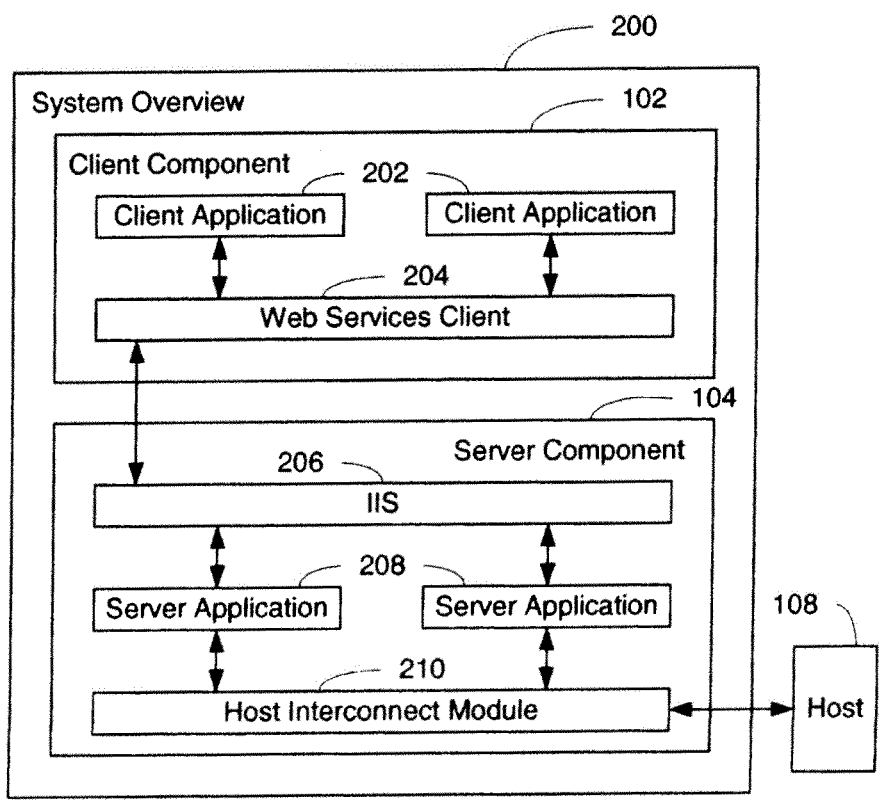
FIG. 2 shows in a layer diagram another example of a system overview of a design, development and operational environment, in accordance with an embodiment of the invention.

FIG. 2 shows in a layer diagram another example of a system overview 200 of a design, development and operational environment, in accordance with an embodiment of the invention. The mobile client component 102 comprises one or more client applications 202 that communicate with a web services client 204. The server component 104 comprises an Internet information server (IIS) 206 for communicating with the web services client 204, one or more server applications 208 and a host interconnect module 210 for communicating with the host (or back-end system) 108. The server applications 208 communicate with both the IIS 206 and the host interconnect module 210.

An application console may be installed as client application 202 on the mobile client component 102 to provide a presentation layer and application framework that end users use to collect, review and modify data. The application console communicates with the server component 104 via web services running on the IIS 206. The server component 104 is a middle tier where data is synchronized before being sent to the back-end system 108.

The server component 104 provides the applications and connectivity options to integrate back-end systems 108. A unified administration console for administering middleware on may be installed as a server application 206 to provide a single source for system management and monitoring and can be used remotely. Advantageously, the unified administrative console simplifies multi-site, multi-device management and deployment. This allows for ease of deployment and controlled rollouts. Host interconnect modules 210 provide the information and logic used to integrate with the back-end systems 108.

Back-end systems 108, whether databases or full-featured ERP systems, are supported via the host interconnect modules 210 installed on the server component 104. Standard interface technologies are supported, including extensible markup language (XML) and open database connectivity (ODBC), as well as ERP-specific interfaces.

Application licensing is a process used to protect the intellectual property of a software vendor. Often the licensing is not only a legal matter, but also includes software components that protect against unauthorized use of the software product. Usually the encrypted license information is stored and checked on a computer where the software is executed. Such storage and checking may not be manageable in an environment with multiple mobile workstations that may be talking to one central server provided if there is a network connection available. Normally, only the server is licensed and the client software is given out for free.

Figure 3:
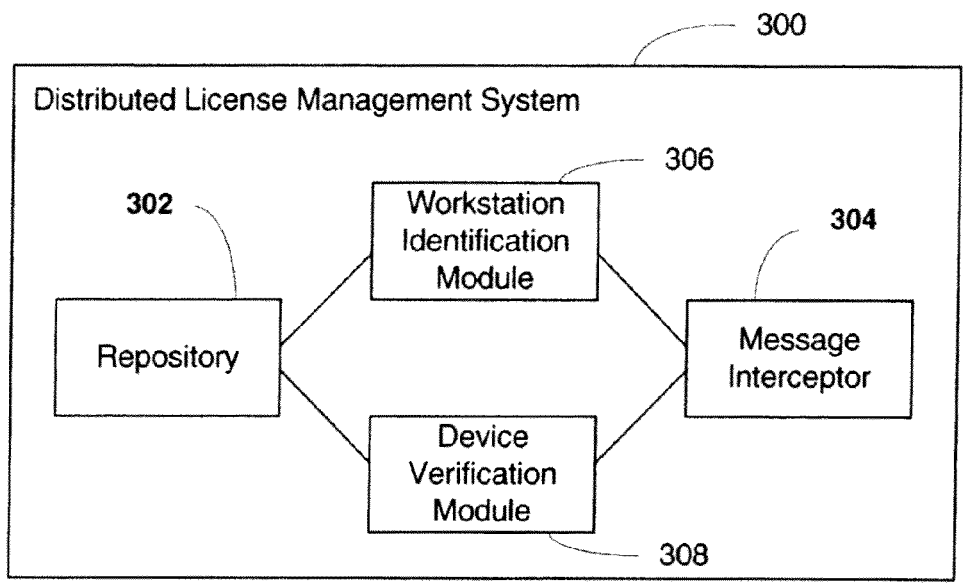
FIG. 3 shows an example of a distributed license management system for managing software licenses, in accordance with an embodiment of the invention.

FIG. 3 shows an example of a distributed license management system 300 for managing software licenses, in accordance with an embodiment of the invention. The distributed license management system 300 comprises a repository 302 for storing workstation (i.e., mobile device 102) information (such as definitions and associations), a message interceptor 304 for intercepting a message call from a workstation 102 to the server 104 (for example, a web service call coming from a web service client 204 to the IIS 206), a workstation identification module 306 for determining if a workstation identifier associated with the web service call is defined in the repository 302, and a device verification module 308 for determining if a device identifier of the workstation 102 is associated with the workstation identifier stored in the server 104. Other components may be added to the distributed licensing management system 300, such as a workstation definition module for defining workstations in the repository 302.

The distributed license management system 300 can be implemented in the IIS 206. Preferably, a license is installed on the server 104 that describes how many workstations 102 are given connection access to the server 104. An administrator may use a workstation definition module to define a licensed number of workstations 102 in the system. Preferably, workstations 102 are defined on the server 104 by placing a workstation identifier (WorkstationID attribute) in a file in the repository 302.

Once the workstations 102 are defined, client software is installed on each workstation 102.

In one embodiment of the distributed license management system, a workstation identifier is written to a workstation during a client software installation. A device will preferably have one predefined workstationID that is assigned to it during the client software installation. Subsequent to the client software installation on the workstation, when the workstation contacts the server for the first time it can request an available workstationID from the server. From that point forward, the workstation identifier is assigned to that device and stored there.

No message call to the server 104 is allowed (completed) by an unlicensed workstation. Since the mobile devices 102 are used to collect field data that is later posted to a server 104 application, it is typically pointless to run an application on a mobile device 102 without any server 104 communication.

The workstations 102 can be used without the license until such time when it needs to communicate with the server 104. Preferably, each workstations 102 has a unique serial number that can be hashed into a UniqueDeviceID attribute (or device identifier) that can be stored in the repository 302 and resettably associated with a workstation identifier. Such unique serial numbers are either obtainable by the server 104 via a call to the workstation or appended to the header of a web services call invoked by the workstation 102.

Figure 4:
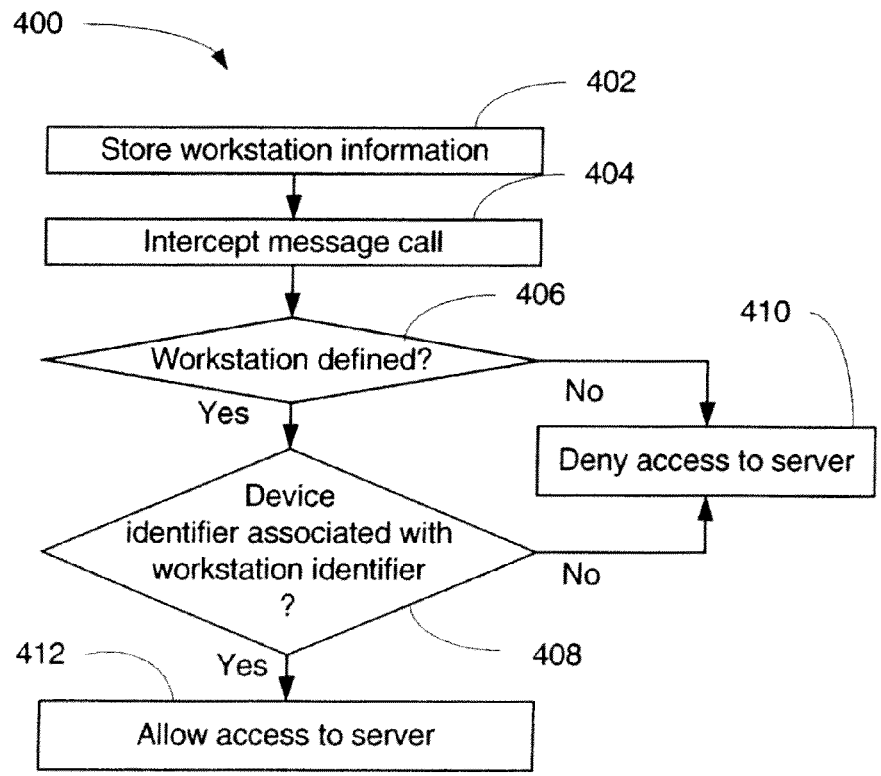
FIG. 4 shows in a flowchart an example of a method of managing software licenses, in accordance with an embodiment of the distributed license management system.

FIG. 4 shows in a flowchart an example of a method of managing software licenses (400), in accordance with an embodiment of the distributed license management system 300. The method (400) comprises the step of storing workstation 102 information (i.e., definitions and associations) (402) on a server 104, preferably in a repository 302. When a message call (for example a web service request) is sent to the server 104 by the workstation 102, the message call is intercepted (404). The header of the message call comprises a workstation identifier and a device identifier of the workstation 102. If the workstation identifier is defined and the workstation information is not stored on the server 104 (406), then access to the server 104 is denied (410). If, in the server repository, the unique device identifier is associated with the workstation identifier (408), then the workstation 102 is given access to the server 104 (412). Otherwise (408), access to the server 104 is denied (410). Other steps may be added to the method (400), such as associating and disassociating device identifiers with workstation identifiers in a repository of the server 104.

Figure 5:
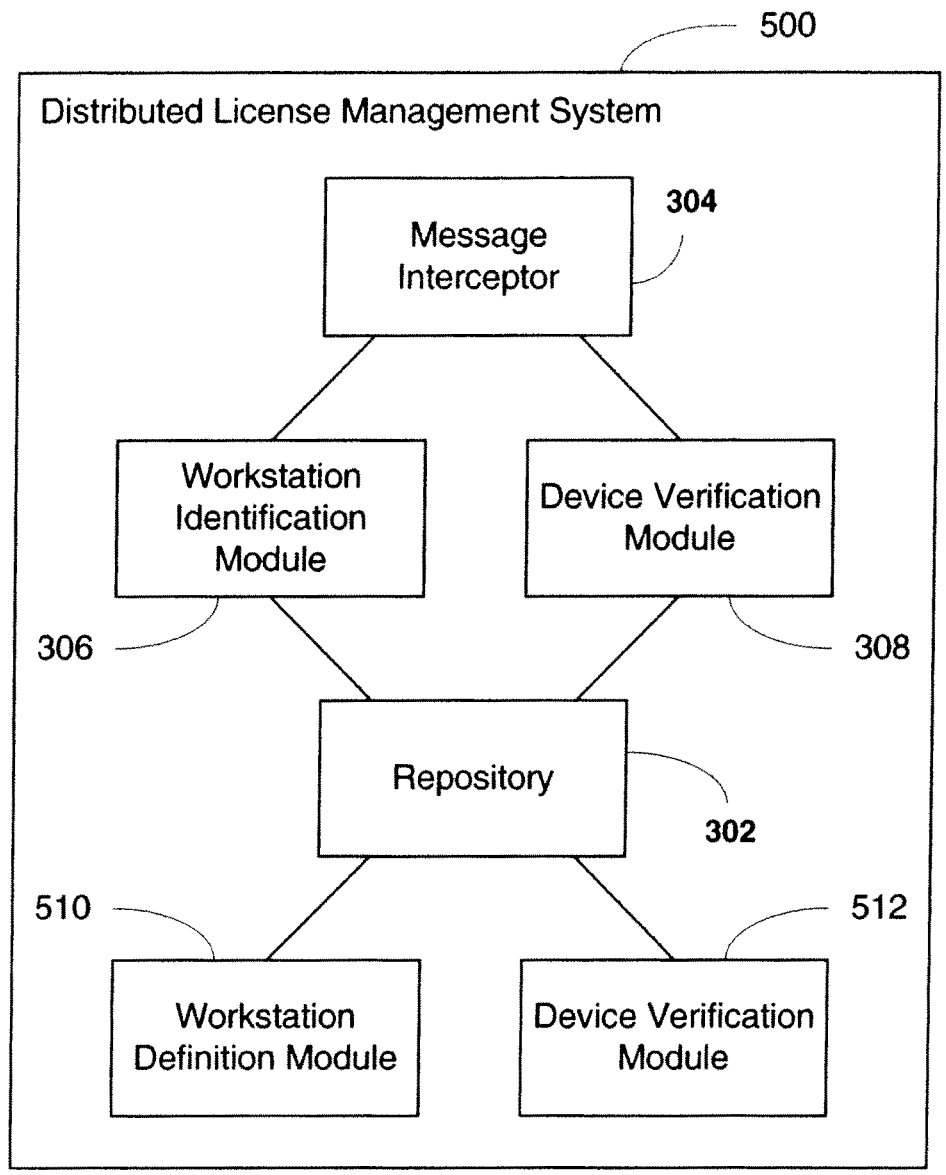
FIG. 5 shows another example of a distributed license management system.

FIG. 5 shows another example of a distributed license management system 500. The distributed license management system 500 comprises the repository 302, the message interceptor 304, the workstation identification module 306, the device verification module 308, a workstation definition module 510 for defining workstation identifiers in the repository 302, and a device registration module 512 for associating device identifiers with the workstation identifiers. These components 302, 304, 306, 308, 510 and 512 are preferably implemented as computer readable code in an IIS 206 of a server 104. Other components may be added to the distributed license management system 500.

Figure 6:
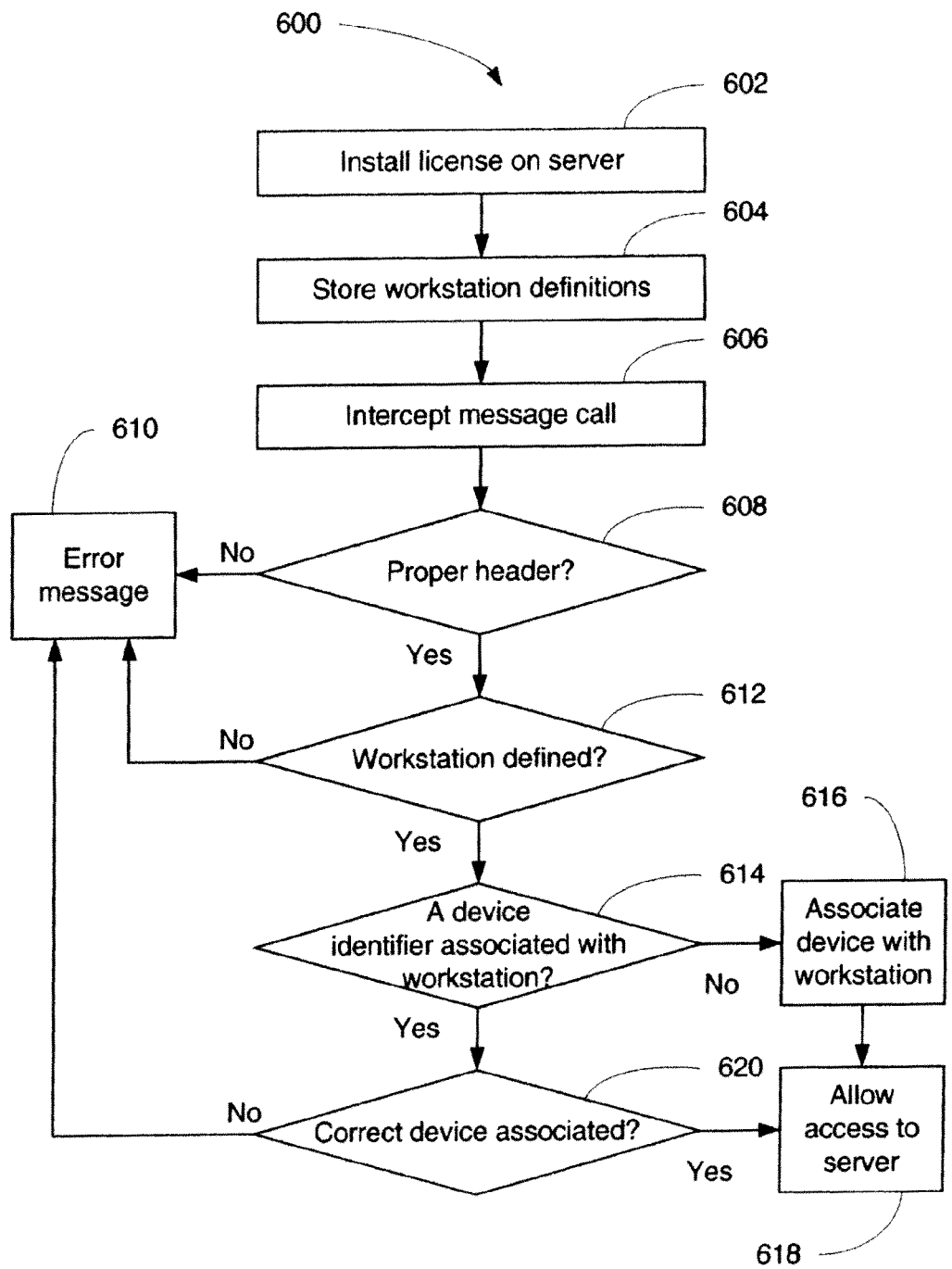
FIG. 6 shows in a flowchart another example of a method of managing software licenses, in accordance with an embodiment of the distributed license management system.

FIG. 6 shows in a flowchart an example of a method of managing software licenses (600), in accordance with an embodiment of the distributed license management system 500. A license is installed on the server 104 (602) that describes how many workstations 102 are given connection access to the server 104 at one time. An administrator may use a workstation definition module 510 to define a set number of workstations 102 to be given access to the server 104. Preferably, the set number is determined by the license. Storing workstation definitions (604) includes the step of storing a workstation identifier in the repository 302. Once workstation identifiers are defined in the repository 302, client software is installed on workstations 102. Preferably, the workstations 102 can be used without the license until such time when the workstation communicates with the server 104 via a web service request. When the server 104 receives a web service request (or message call) from a workstation 102, the message call is intercepted by the message interceptor 304 (606).

Preferably, a simple object access protocol (SOAP) call is received that includes a message header carrying a workstation identifier (or WorkstationID attribute) and a device identifier (or UniqueDeviceID attribute). Preferably, the UniqueDeviceID attribute is a hashed serial number of the device (serial number and disk serial number in case of a PC).

If the message call does not include a message header having a workstation identifier and device identifier (608), then an error is raised and access to the server 104 is denied (610). Otherwise, (608), the workstation identifier is used to determine if the workstation sending the call is defined (612) in the repository 302. Preferably, the workstation identifier is compared with the stored workstation entries in the repository 302. If a match is not found then the workstation is not defined (612). An error is raised and access to the server 104 is denied (610). If a match is found then the workstation is defined (612). If there is no device identifier associated with the workstation identifier (614), then the device identifier in the message header is associated with the workstation identifier (616) in the repository 302 and access to the server 104 is permitted. If there is a device identifier associated with the workstation identifier (614) and if the device identifier in the message header does not match the associated device identifier (620) in the repository 302, then an error is raised and access to the server 104 is denied (610). If the device identifier in the message header matches the associated device identifier (620), then access to the server 104 is permitted.

Other steps may be added to the method (600), including the step of disassociating a device identifier from a workstation identifier in the repository 302. Administrators can use the device registration module 512 to reset workstation-device associations stored in the repository 302. For example, if the physical device 102 becomes damaged and replaced by a new one, the system administrator can clear the device identifier of the damaged device that is associated with a workstation identifier, thus freeing the spot for the next claimant.

Any error message generated by the method (600) may be sent to the device 102 that initiated the message call. If the workstation identifier provided in the message header is in use by another device 102 (620) then the message call may be resent with the message header modified such that a different workstation identifier is used. Preferably, defined workstation identifiers are stored in a repository on the device 102 or on the server and requested by the device as described above.

Advantageously, the system 300, 500 and method 400, 600 of distributed licensing management allow for centrally managed application licensing that is transparent to the user upon installation of the client application (i.e., no need to enter license keys). The system 300, 500 provides for licensing of applications that run on the mobile devices 102, easy-to-use license management (the first claimant to hit the server claims the workstation identifier; can be reset if necessary). Preferably, there is no license information on the mobile device 102 (other than one or more stored workstation identifier values), since all checks are performed when the device 102 contacts the server 104.

Advantageously, the system 300, 500 and method 400, 600 of distributed licensing management allow for central license management. License information may be attached automatically to outgoing web service calls. "Spoofing" protection is provided by combining server defined WorkstationID attribute (workstation identifier) with a UniqueDeviceID attribute (device identifier) based upon unique information of the device. Moreover, "First come first served" assignment of available licenses can be used such that a plurality of devices can efficiently share a plurality of licenses, which allows a higher number of devices to share a lower number of licenses.

Thus, when a license is not in use by one device, another device can use the license. The UniqueDeviceID attributes can be reset on the server 104, which allows for periodic "first come first served" assignment of available license, and in case of a physical device needing to be replaced with a different device.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

The invention claimed is:

1. A computer implemented method of sharing a software license of a software among a plurality of mobile devices, the method comprising:
at a server, assigning, to a mobile device, on a first come first served basis, a server defined identifier, the server defined identifier identifying device information of the mobile device, the device information being stored on a repository and associating the mobile device with a software license, the license being shared by a plurality of mobile devices, including associating a device identifier of the mobile device with the server defined identifier in the repository, wherein the associations indicate that the mobile device is a licensed device for using the software;
at the server, managing a message call from each mobile device to the server, including:
intercepting the message call coming from first mobile device to the server, the message call having a header containing the device identifier and the server defined identifier of the first mobile device;
determining, using the server defined identifier in the header of the message call, whether the first mobile device is defined by searching the repository for the device information associated with the first mobile device;
when the first mobile device is not defined, denying the first mobile device access to the server;
when the first mobile device is defined and the device information is not associated with any device identifier, associating the device identifier in the header of the message call with the device information and accepting access from the first mobile device to the server, wherein the association indicates that the first mobile device is a licensed device for using the software;
when the first mobile device is defined and a device identifier in the device information matches the device identifier in the header of the message call, accepting access from the first mobile device to the server; and
at the server, disassociating the device identifier from the server defined identifier by clearing the device identifier in the device information in the repository in a predetermined condition so that the server defined identifier with no association with a device identifier in the repository is assignable at the step of assigning.

2. The method as claimed in claim 1, wherein the message call comprises a server defined identifier, and wherein determining comprises:
  obtaining the server defined identifier from the message call.

3. The method as claimed in claim 2, wherein determining comprises:
  obtaining the device identifier from the message call when the server defined identifier obtained from the message call is defined on the server,
  access to the server from the first mobile device being denied when the server defined identifier obtained from the message call is associated to a device identifier different from that of the message call.

4. The method as claimed in claim 2, comprising at least one of:
  denying access to the server from the first mobile device when the server defined identifier obtained from the message call is not defined in the repository; and
  denying access to the server from the first mobile device when the server defined identifier obtained from the message call is associated to a device identifier different from that of the message call, in the repository.

5. The method as claimed in claim 1, comprising:
  installing a license on the server to describe how many mobile devices are given connection access to the server.

6. The method as claimed in claim 1, wherein the message call comprises the server defined identifier, and wherein determining comprises:
  comparing the server defined identifier obtained from the message call with the server defined identifier defined in the repository; and
  sending an error message to the first mobile device when a match is not found at the step of comparing.

7. The method as claimed in claim 1, wherein associating comprises:
  associating the device identifier with an available server defined identifier in the repository when there is no device identifier associated with the available server defined identifier.

8. The method as claimed in claim 5, comprising:
  receiving an updated message call having a message header with a different server defined identifier.

9. The method as claimed in claim 1, comprising:
  at the mobile device, storing the server defined identifier assigned during assigning, in the mobile device.

10. The method as claimed in claim 1, comprising:
  at the mobile device, requesting an available server defined identifier to the server.

11. The method as claimed in claim 1, comprising:
  at the server sending an error message to the first mobile device when the message call does not include a message header having the server defined identifier or the device identifier.

12. A computer-readable storage memory storing computer-executable codes for sharing a software license of a software among a plurality of mobile devices, comprising:
  code for assigning, to a mobile device, on a first come first served basis, a server defined identifier, the server defined identifier identifying device information of the mobile device, the device information being stored on a repository, and associating the mobile device with a software license, the license being shared by a plurality of mobile devices, including code for associating a device identifier of the mobile device with the server defined identifier in the repository, wherein the associations indicate that the mobile device is a licensed device for using the software;
  code for managing a message call from each mobile device to the server, including:
    code for intercepting the message call coming from a first mobile device to the server, the message call having a header containing the device identifier and the server defined identifier of the first mobile device;
    code for determining, using the server defined identifier in the header of the message call, whether the first mobile device is defined by searching the repository for the device information associated with the first mobile device;
    code for denying the first mobile device access to the server when the first mobile device is not defined;
    code for associating the device identifier in the header of the message call with the device information and accepting access from the mobile device to the server, when the first mobile device is defined but the device information is not associated with any identifier, wherein the association indicates that the first mobile device is a licensed device for using the software;
    code for accepting access from the first mobile device to the server, when a device identifier in the device information matches the device identifier in the header of the message call; and
  code for disassociating the device identifier from the server defined identifier clearing the device identifier in the device information in the repository in a predetermined condition so that the server defined identifier with no association with a device identifier in the repository is assignable for the code for assigning.

13. The method as claimed in claimed 5, comprising:
  installing client software on the mobile device.

* * * * *